US011790250B2

(12) United States Patent
Apparao et al.

(10) Patent No.: US 11,790,250 B2
(45) Date of Patent: Oct. 17, 2023

(54) USING COMPUTATIONAL COST AND INSTANTANEOUS LOAD ANALYSIS FOR INTELLIGENT DEPLOYMENT OF NEURAL NETWORKS ON MULTIPLE HARDWARE EXECUTORS

(71) Applicant: Intel Corporation, Santa Clara, CA (US)

(72) Inventors: Padmashree Apparao, Portland, OR (US); Michal Karzynski, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 1155 days.

(21) Appl. No.: 16/407,252

(22) Filed: May 9, 2019

(65) Prior Publication Data

US 2019/0266504 A1 Aug. 29, 2019

(51) Int. Cl.
*G06N 5/04* (2023.01)
*G06N 3/08* (2023.01)
(52) U.S. Cl.
CPC ............... *G06N 5/04* (2013.01); *G06N 3/08* (2013.01)
(58) Field of Classification Search
CPC .. G06N 5/04; G06N 3/08; G06N 3/06; G06N 3/04
See application file for complete search history.

(56) References Cited

U.S. PATENT DOCUMENTS

| 2017/0124452 | A1* | 5/2017 | Tucker | G06N 5/048 |
|---|---|---|---|---|
| 2019/0114537 | A1* | 4/2019 | Wesolowski | G06N 3/105 |
| 2020/0242189 | A1* | 7/2020 | Chatterjee | G06F 17/10 |
| 2020/0249998 | A1* | 8/2020 | Che | G06N 3/0454 |
| 2020/0342286 | A1* | 10/2020 | Zhang | G06N 3/10 |

FOREIGN PATENT DOCUMENTS

EP 3353656 A1 8/2018

OTHER PUBLICATIONS

Abadi et al., "TensorFlow: Large-Scale Machine Learning on Heterogeneous Distributed Systems", Mar. 14, 2016 (Year: 2016).*
European Search Report and Written Opinion for the International Patent Application No. EP20165322, dated Sep. 24, 2020, 12 pages.

* cited by examiner

*Primary Examiner* — Kamran Afshar
*Assistant Examiner* — Brian J Hales
(74) *Attorney, Agent, or Firm* — KDW Firm PLLC

(57) ABSTRACT

Various embodiments are generally directed to an apparatus, system, and other techniques for dynamic and intelligent deployment of a neural network or any inference model on a hardware executor or a combination of hardware executors. Computational costs for one or more operations involved in executing the neural network or inference model may be determined. Based on the computational costs, an optimal distribution of the computational workload involved in running the one or more operations among multiple hardware executors may be determined.

20 Claims, 9 Drawing Sheets

*300*

*340*

*320*

400

USING COMPUTATIONAL COST AND INSTANTANEOUS LOAD ANALYSIS FOR INTELLIGENT DEPLOYMENT OF NEURAL NETWORKS ON MULTIPLE HARDWARE EXECUTORS

TECHNICAL FIELD

Embodiments described herein generally relate to techniques for providing dynamic deployment of neural networks on multiple hardware executors.

BACKGROUND

Artificial intelligence (AI), sometimes referred to as machine learning, may be utilized in numerous industries among a wide range of users (e.g., developers, end-users, etc.) and relied upon to provide answers to complex problems rapidly. In certain use-cases, an AI serving model, platform, or solution may need to make accurate and fast predictions in real-time or near real-time. This may require the synchronous orchestration of both software and hardware components.

Moreover, hardware choices for AI are growing as hardware vendors produce faster and customized hardware components tailored to specific types of inference models. The numerous different software and hardware choices, however, make it difficult for operations engineers to select optimal (e.g., fast, reliable, accurate) hardware components for a given type of model at specific times. Often times, one piece of hardware may be computationally overloaded when running a model while other pieces of hardware may be underutilized.

DETAILED DESCRIPTION

Figure 1:
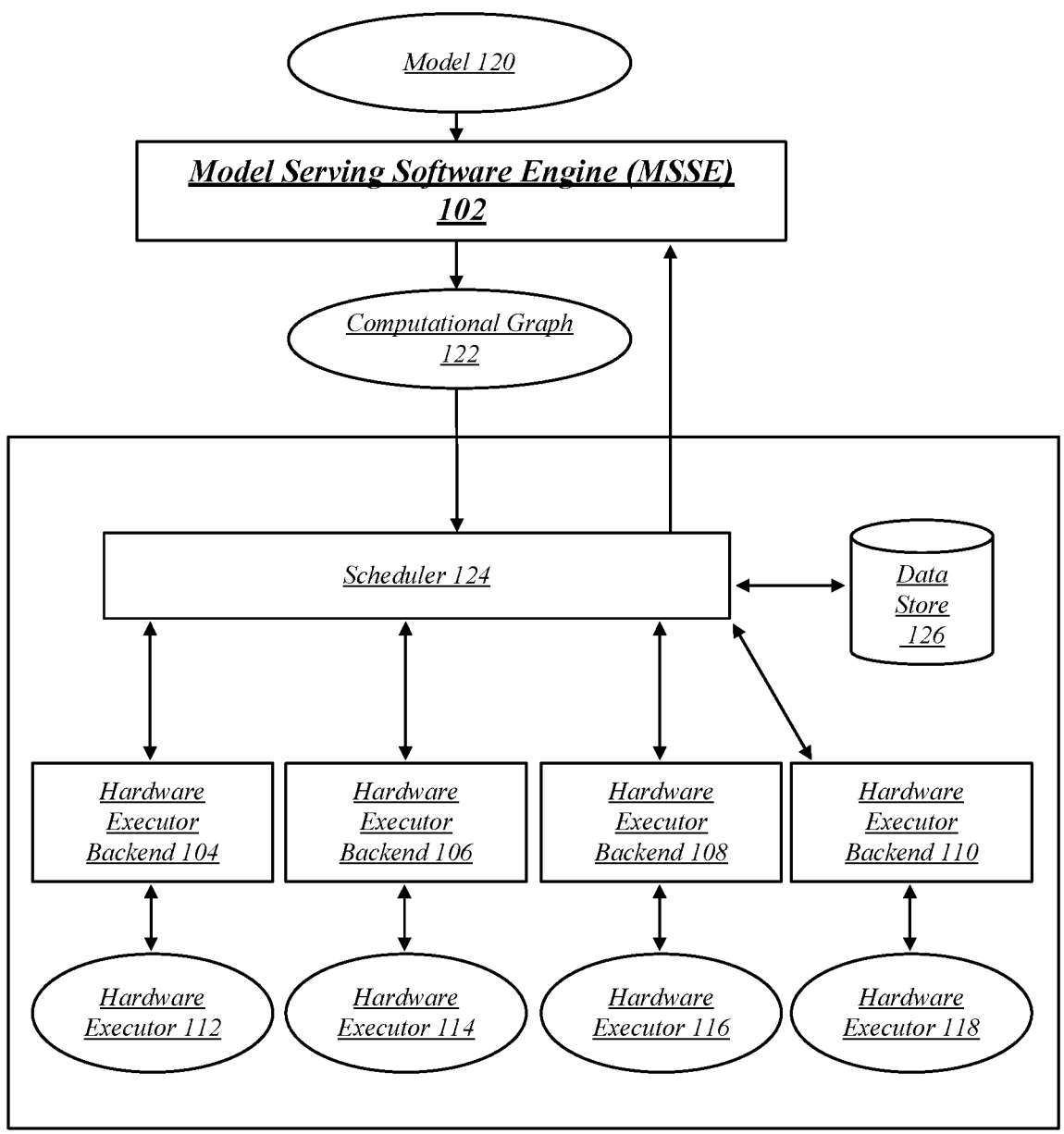
FIG. 1 illustrates a first example flow diagram according to one or more embodiments.

Various embodiments are generally directed to providing dynamic deployment of neural networks on multiple hardware executors. In embodiments, a software platform may select, from one or more hardware executors, the "optimal" executor or the "optimal" combination of executors for running and supporting an inference model (e.g., artificial neural networks) based on the current status of the one or more hardware executors. The software platform may have access to various real-time or near real-time information on the available executors, such as executor specifications, real-time performance-related data, etc., prior to selection. Moreover, the software platform may gather various types of data from the inference model, which allows the software platform to learn the requirements of the model and select, over time, the best hardware executor(s) to perform the model computations.

For example, while a vision processing unit (VPU) may be the best hardware executor for a vision model, the software platform may determine that an field programmable gate array (FPGA), or a combination of the FPGA and the VPU, may be the optimal executor(s) to deploy the vision model based on the dynamic load of the available executors at that specific time and model requirements, such as required memory size, bandwidth, computation needs, etc. The disclosure often uses the term "optimal" and gives examples of determining an optimal hardware executor or group of hardware executors. The term optimal is used for convenience and clarity in describing the hardware executor or group of hardware executors selected by the devices and methods described herein. It is not intended to imply an ideal choice as may be made by a human operator or to imply a subjective choice based on human desires or biases.

The term "hardware executor" or "executor" may be understood to broadly mean any hardware component, e.g., central processing units (CPUs), graphics processing units (GPUs), vision processing units (VPUs), field programmable gate arrays (FPGAs), neural network accelerators, etc., capable of running, executing, or otherwise supporting the deployment of inference solutions, such as artificial neural networks.

Previous or currently existing solutions do not use any dynamic knowledge in determining how and/or what hardware executors to choose to run inference models at specific times. Rather, inference models were executed based on static knowledge of hardware capability with no knowledge of the current status of the executors, e.g., whether an executor may be overloaded compared to others. Thus, one of the many disadvantages of previous or existing solutions is that they do not consider dynamic executor load information or information on the speed with which operations can be computed on the executors at specific times, which may cause high latency in the inference computing.

The embodiments and examples described herein overcome the above problems. For example, by providing an MSSE with dynamic information or the MSSE dynamically determining the information, such as current utilization of one or more executors in real-time or near real-time (e.g., instantaneous load analysis) and/or computational costs, the MSSE can further determine that a specific hardware executor or a specific set of hardware executors are optimal for deploying an inference model. Thus, one of the numerous advantages is that dynamic gathering of information and the intelligent scheduling of the hardware executors will enable faster responses to end-users and will also ensure that all available hardware will be optimally and resourcefully utilized.

FIG. 1 illustrates an example flow diagram 100 of deploying a model to a hardware device according to embodiments of the present disclosure. As shown, communication may be established between at least a model serving software engine (MSSE) 102, which may be a software platform that an end-user interfaces with by feeding specific models and/or data, and hardware executor backends 104, 106, 108, and 110, each of which may be a software and/or hardware component able to execute computational graphs on a specific hardware executor (e.g., hardware executors 112, 114, 116, and 118) or otherwise able to provide information on the hardware executor.

In embodiments, the MSSE 102 may facilitate deployment of the model to the one or more hardware executors 112, 114, 116, and 118. Model 120 may generally be referred to as an inference model and can include any of a variety of models arranged to generate an output (e.g., inference) from input(s). For example, a model 120, e.g., an inference model, an artificial neural network model, etc., may be input to the MSSE 102. The model 120 may be provided by an end-user, which may be a specific model the end-user desires to train or perform predictions with. As will be further described below, the MSSE 102 may receive and convert the model 120 into at least one computational graph 122, which may be a neural network model described in terms of a graph of operations, such as mathematical operations described by operator type, input size, and other parameters of the operation (e.g., padding, stride for a convolution, etc.). Thereafter, at least one computational graph 122 may be provided to a scheduler 124. In some examples, the scheduler 124 may be a component of the MSSE 102 or may be a standalone component configured to coordinate the execution of a computational graph on one or more hardware executor backends.

The scheduler 124 may access or use information (e.g., gathered information or information being gathered from the one or more hardware executor backends 104, 106, 108, 110) that may be stored in data store 126 and may determine which portions of the computational graph 122 to send to each of the hardware executor backends 104, 106, 108, 110. One or more of the selected hardware executors 112, 114, 116, and 118 may run the model 120 and provide various results back to the MSSE 102 via the scheduler 124.

Figure 2:
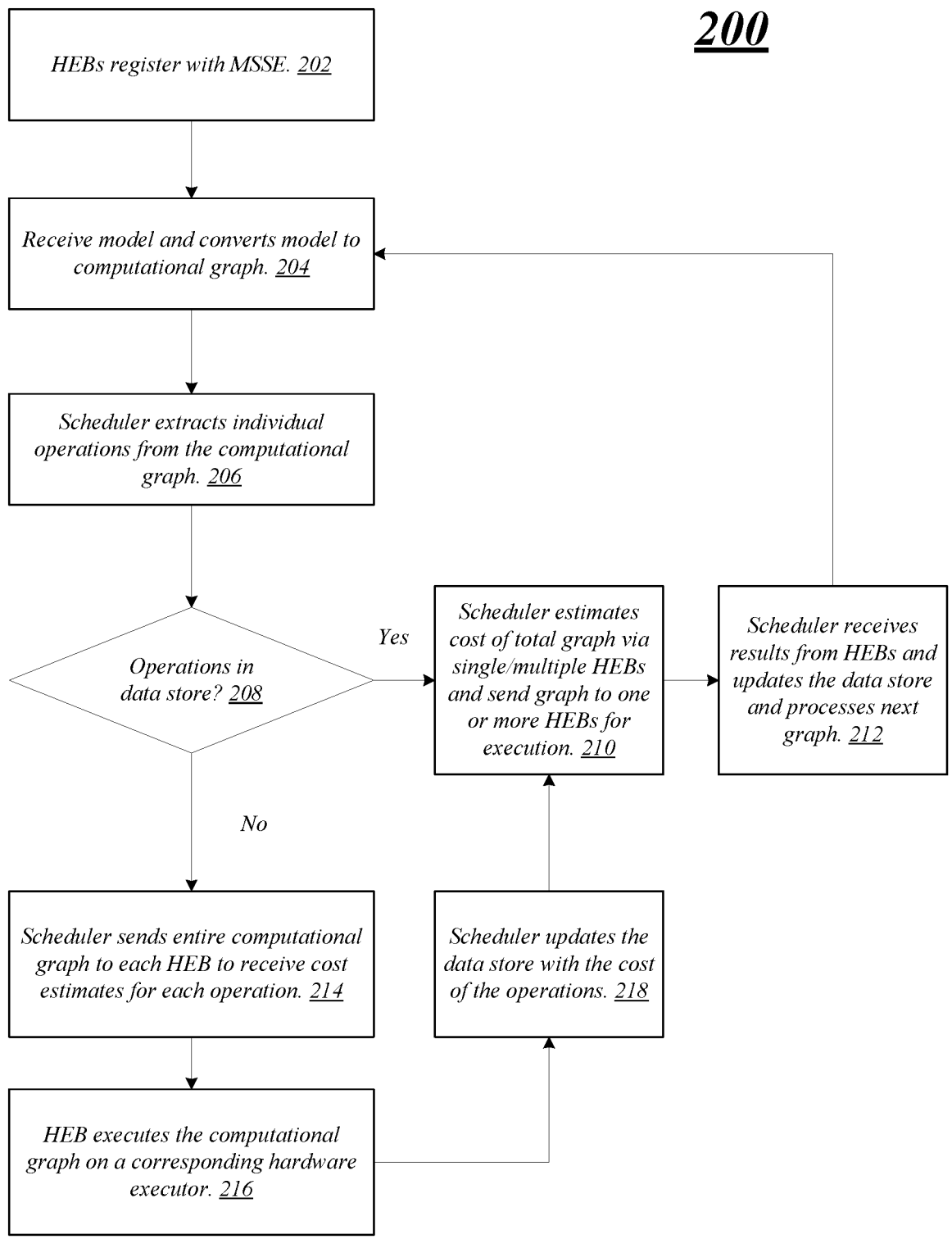
FIG. 2 illustrates a second example flow diagram according to one or more embodiments.

FIG. 2 illustrates an example flow diagram 200 of intelligent scheduling according to embodiments of the present disclosure. As illustrated, at block 202, one or more hardware executor backends (HEBs) register with a model servicing software engine (MSSE) and also register the operations the HEBs support. At block 204, the MSSE receives the model and converts the model into a computational graph. At block 206, a scheduler may extract one or more individual operations from the computational graph. The scheduler, at block 208, may determine whether the extracted individual operations are stored in a data store, which may maintain information on various operations or computational costs. It may be understood that the term "cost" broadly refers to time and/or resources required to complete a specific task, such as executing an operation or transferring data, and can be measured in terms of time needed to complete the task, required power consumption, memory usage, disk usage, etc. Moreover, "operation cost" or "computational cost" or "operation computational cost" may broadly be understood to mean any cost required to complete the computation of an operation on a given hardware executor.

When it is determined at block 208 that the extracted operations are indeed in the data store, the scheduler, at block 210, may determine an intelligent estimate of the cost of the computational graph using single or multiple HEBs and may either send the computational graph to one or more multiple HEBs for execution. In examples, the intelligent estimate may be based on the cost of the operations in addition to information on how much load is already on each HEB. At block 212, the scheduler receives results from the HEBs (which may also, in examples, be returned to the end-user), updates the data store, and proceeds to the next computational graph, as indicated by the arrow pointing to block 204. For example, when the scheduler dispatches a new graph or subgraph to an HEB for execution, the scheduler may maintain a "load" indicator to track how many graphs or subgraphs are queued at the HEB.

When it is determined at block 208 that the extracted operations are not in the data store, the scheduler, at block 214, may send the entire computational graph to each HEB to obtain computational cost estimates for each extracted operation of the computational graph. At block 216, each HEB may execute the computational graph on a corresponding hardware executor. The scheduler may receive from each of the HEBs the operation costs associated with the graph, and at block 218, the scheduler may update the data store with those costs. Upon updating the data store, the scheduler may proceed with determining the intelligent estimate, as indicated by the arrow pointing to block 210 from block 218.

Thus, the flow of the intelligent scheduling procedure shown in the flow diagram 200 may include at least four different stages: (i) initialization (e.g., blocks 202, 204, 206, 208 of FIG. 2), (ii) graph profiling (e.g., blocks 214, 216, 218), (iii) graph partitioning (e.g., block 210), and (iv) execution (e.g., block 212), each of which will be further described below.

During the initialization stage, as described above, the MSSE may detect all available hardware executor backends. In examples, the MSSE receives an inference model or a neural network model and sends it as a computational graph to a scheduler for analysis. The scheduler may scan the graph and determine whether all operations contained in the graph have been previously executed on all available hardware executor backends. When records of computational costs associated with all operations exist in the data store, graph partitioning may be performed. Otherwise, graph profiling may be performed.

Figure 3A:
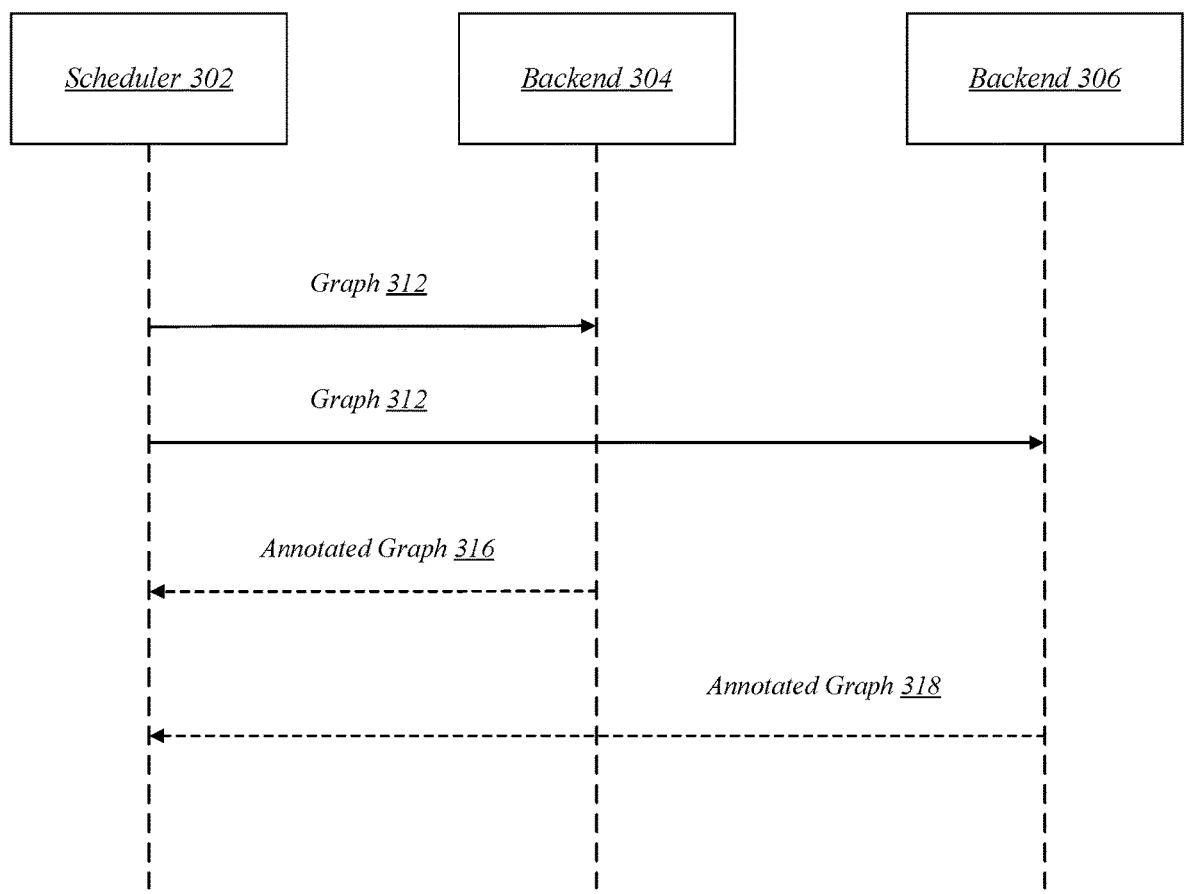
FIG. 3A illustrates a sequence diagram according to one or more embodiments.

FIG. 3A illustrates a sequence diagram 300 of information exchange between a scheduler and multiple hardware executor backends during graph profiling according to embodiments of the present disclosure. As shown, a scheduler 302 may send a same computational graph 312 to each available hardware executor backend, backends 304, 306, respectively, for analysis and annotation. In examples, the scheduler 302 may send the entire computational graph 312, or in other examples, the scheduler 302 may send portions of the graph 312 containing only operations with unknown computational costs.

Upon receiving the graph 312, the backends 304 and 306 may perform computations of the graphs on randomly generated data using their respective hardware executors. The backends 304 and 306 may then calculate the computational costs of the one or more operations based on the measurements of the performed computations of the graph 312.

As will be further described below, the backends 304 and 306 may mark and/or annotate each operation in the computational graphs with at least information related to whether the hardware executor supports the type of operation and how much the operation costs. If the backend is capable of fusing one or more operations into one computation for better performance, the edges in the graph connecting the fused operations may be marked as fused or unbreakable. Thereafter, the hardware executor backends 304 and 306 return annotated graphs 316 and 318 to the scheduler 302, as shown.

Figure 3B:
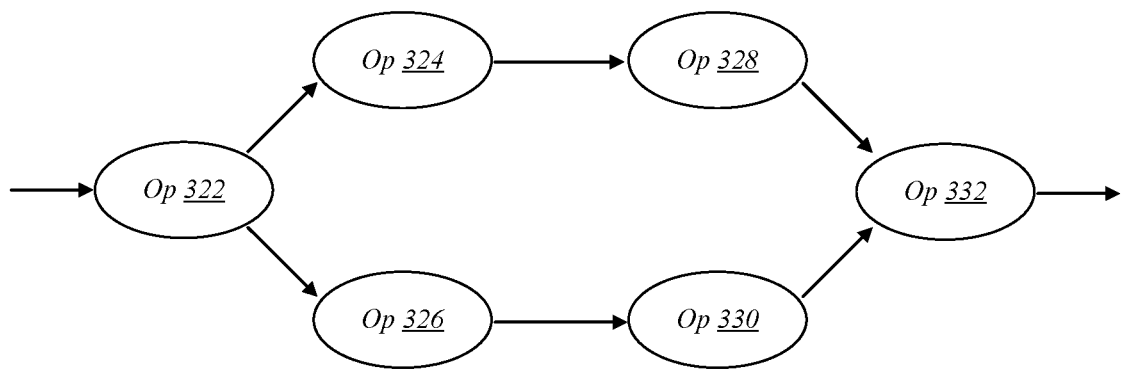
FIG. 3B illustrates an example annotated computational graph according to one or more embodiments.
Figure 3B:
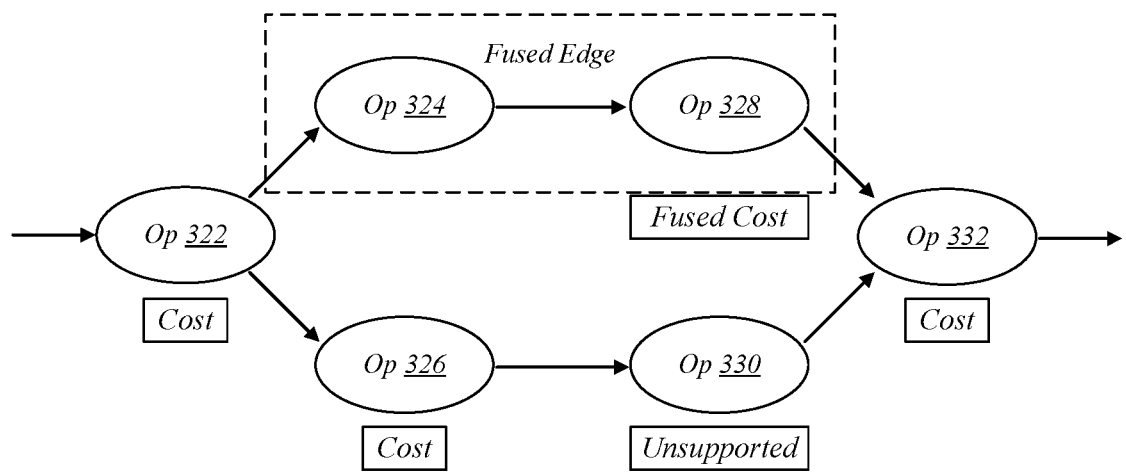

FIG. 3B illustrates an example annotated computational graph 320 according to embodiments of the present disclosure. As illustrated, the annotated computational graph 320 may be an annotated version of computational graph 340. The computational graph 340 may have six different operations (abbreviated as "Op") 322, 324, 326, 328, 330, and 332, which, for example, forms at least two divergent operational routes or paths, e.g., a 322-324-328-332 route or path, a 322-326-330-332 route or path. As set forth above, the computational graph 340 may be sent to one or more hardware executor backends for analysis.

In examples, one or more backends may annotate the computational graph 340 to indicate computational costs associated with each operation, whether operations can be fused, and whether any of the operations are unsupported by the backend(s). As shown in the annotated graph 320, the costs corresponding to operations 322, 326, and 332 may be indicated. Moreover, it may be determined that operations 324 and 328 can be fused to form a fused edge, which is also indicated in the annotated graph 320 along with the fused computational cost. The annotated graph 320 may also indicated that operation 330 is unsupported. A scheduler, such as the scheduler 302 of FIG. 3A, may receive the annotated computational graph 320, deconstruct the graph into single or fused operations, and store all cost information in data store(s).

As described above, when records of computational costs associated with all operations of an annotated graph exist in a data store, graph partitioning may be performed. In examples, a scheduler may search the annotated graph for a path generating the lowest total computational cost during the graph partitioning procedure, e.g., determining the optimal combination of hardware executors for computing various portions of the graph. The scheduler may determine to partition the graph among multiple hardware executor backends that serve different hardware executors, e.g., a portion of the graph may run on a CPU while a different portion may run on a GPU and yet another portion of the graph may run on an FPGA. This determination, for example, may be based on the combined total cost, which may include the operation cost, communication penalty cost, and a queuing load cost. The term "communication penalty cost" may be understood to mean any cost needed to transfer data between hardware executors and its value may be proportional to the size of exchanged data and communication interface speed. Moreover, the term "queuing load cost" may refer to any cost required to process all requests queued at a given hardware executor.

According to an embodiment, the following may be an equation used in computing the total graph cost:

$$\text{Total Cost} = \sum_{g=1}^{g=s} \sum_{o=1}^{o=n_g} OpCost_o + (s-1) * PCost + \sum_{j=1}^{j=n_{HE}} QCost(HE_j)$$

Where s is the number of subgraphs, $n_g$ is the number of operations in a given subgraph, $n_{HE}$ is the number of executors used to compute the entire graph, $OpCost_o$ is the cost of an operation computed on a chosen executor, based on the combined annotated graph, PCost is the communication penalty cost, added when the graph is partitioned across different executors (e.g., the actual value of this cost may be computed based on the operation after which partitioning takes place), $QCost(HEj)$ is the cost of queuing a graph at a hardware executor j (e.g., it is the estimated total time needed to process all requests queued up at that hardware executor).

Figure 4:
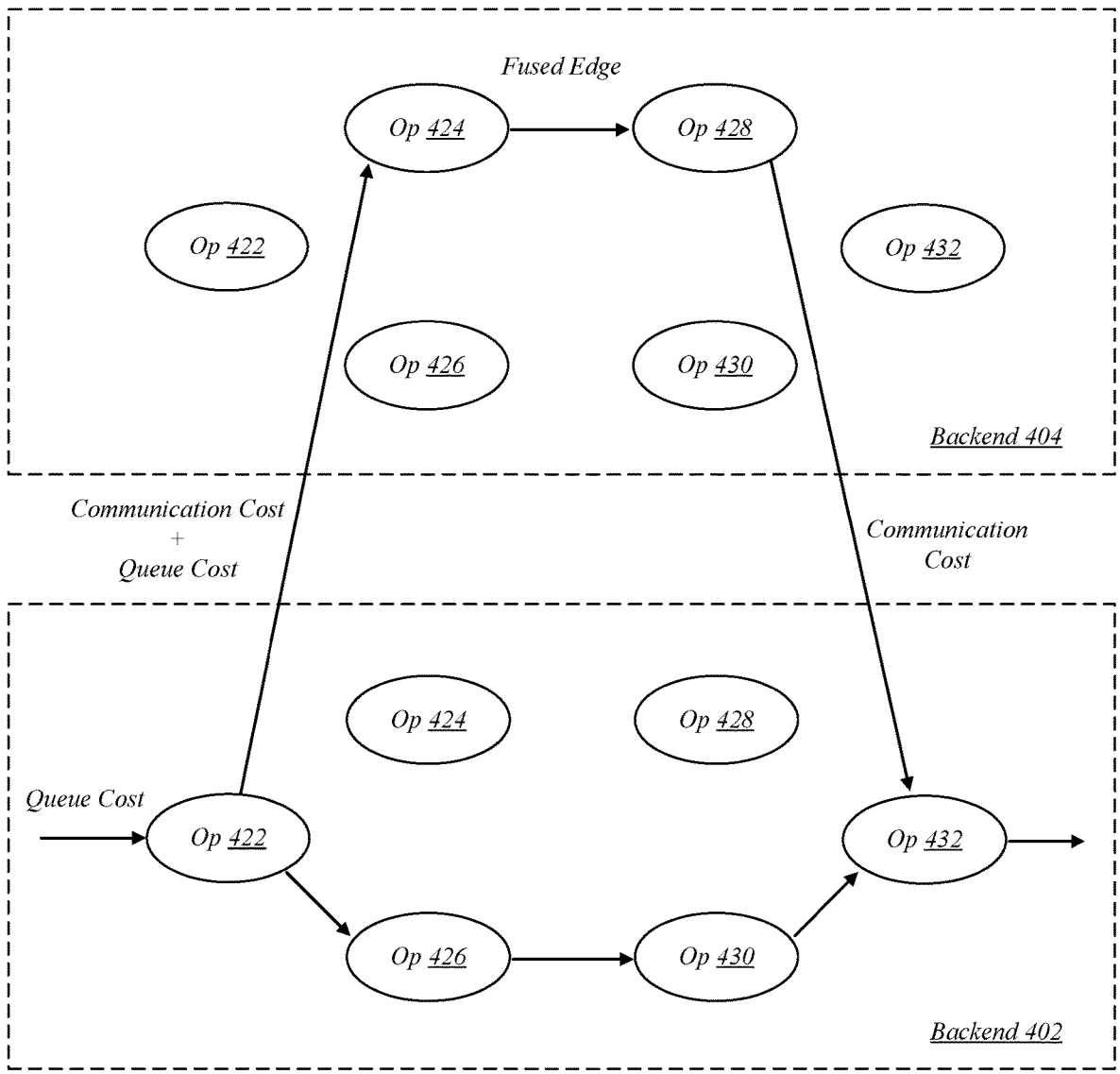
FIG. 4 illustrates an example minimal cost path through an annotated computational graph according to one or more embodiments.

FIG. 4 illustrates an example minimal cost path through at least two hardware executor backends of an annotated computational graph 400 according to embodiments of the present disclosure. The minimal (or optimal) cost path is represented by the paths formed by the contiguous arrows arranged both in backends 402 and 404, as shown. The minimum cost path covers all operations ("ops" 422, 424, 426, 428, 430, 432), some of which are performed in backend 402 (ops 422, 426, 430, and 432) and the others performed in backend 404 (ops 424, 428).

For example, splitting the computational graph 400 between multiple backends may add additional communication costs, and further, each utilized backend adds its queue cost to the total cost. Thus, the minimal (or optimal) cost path represents the path with lowest calculated total cost (e.g., based on the above equation). Moreover, the scheduler may partition the graph into subgraphs based on the optimal cost path, where each subgraph may be sent to the hardware executor backend for execution, which will be further described below. In FIG. 4, Op 422 of the minimal cost path forms a first subgraph, Ops 424 and 428 form a second subgraph, and Ops 426, 430, and 432 form a third subgraph.

According to embodiments, during the execution procedure, the scheduler may send a subgraph to a backend for computation. The scheduler may store the estimated total cost of the subgraph computation for a given hardware executor backend in a queue for that backend. The hardware executor backend then performs the computation of the operations of the received computational subgraph on its respective hardware executor. Thereafter, the computational result may be returned to the scheduler, after which the scheduler may remove the queue entry for the completed computation. In examples, if the graph is partitioned, the scheduler may collect partial results from one execution and sends it as input to another execution. It may be understood that multiple iterations may be run in parallel. The final result(s) may be returned to an MSSE and/or to the user.

According to further embodiments, a re-profiling procedure may be performed. For example, if multiple executions of the same computational graph are performed, the scheduler may periodically repeat the graph profiling procedure in order to update its data store with current values of computational costs for each operation in use. Based on the updated cost information, the scheduler may repeat the graph partitioning procedure and potentially change or modify which parts of the model are executed on which backend. It may be understood that the re-profiling procedure may be an optional procedure.

Figure 5:
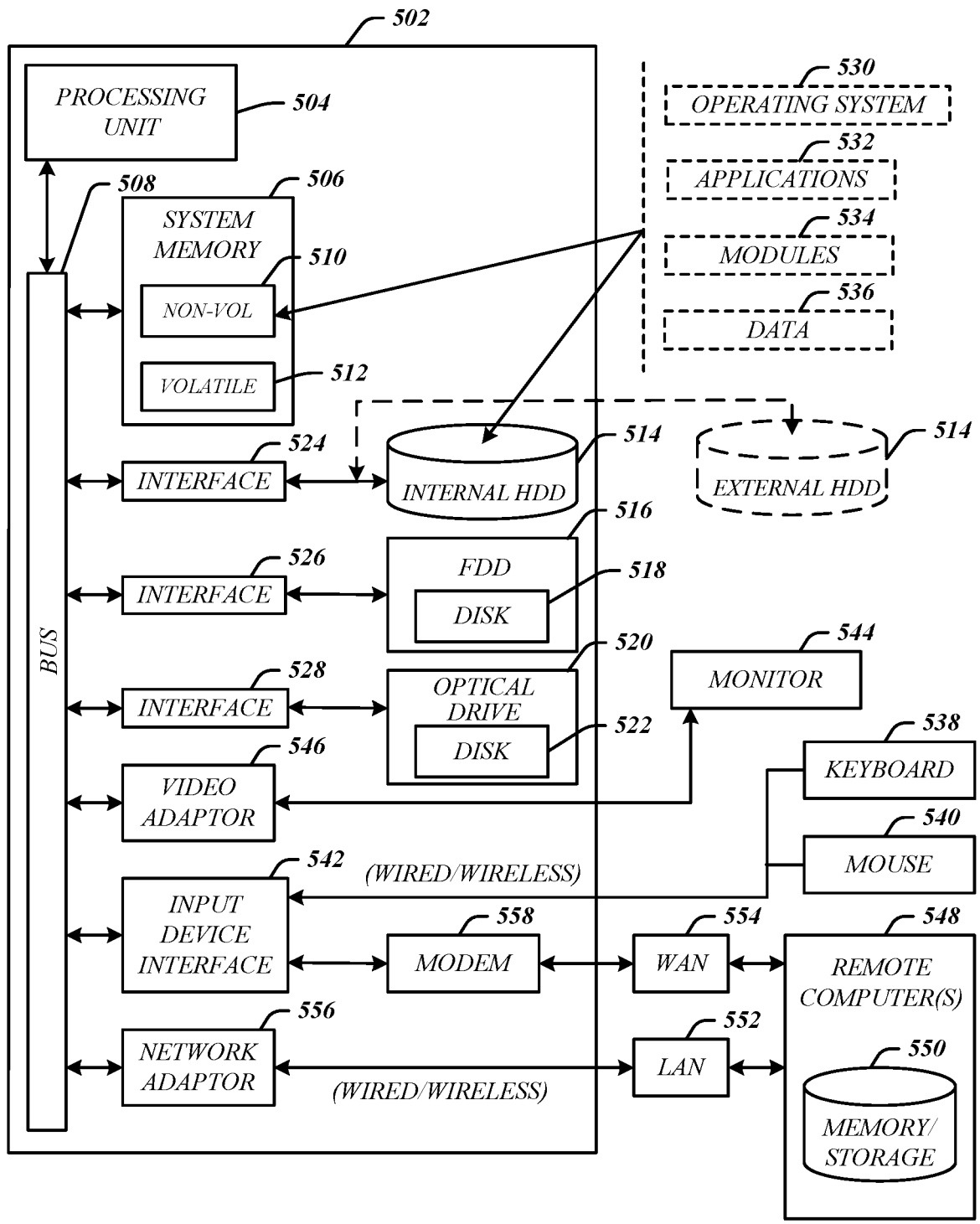
FIG. 5 illustrates an example computing architecture according to one or more embodiments.

FIG. 5 illustrates an example computing architecture 500, e.g., of a computing device, such as a computer, laptop, tablet computer, mobile computer, smartphone, etc., suitable for implementing various embodiments as previously described. Moreover, the computing device may be a computing device in a data center (e.g., server infrastructure, virtualized server infrastructure) and/or may be a cloud-based computer in cloud computing environments. In one embodiment, the computing architecture 500 may include or be implemented as part of a system, which will be further described below. In examples, one or more computing devices and the processing circuitries thereof may be configured as components of the MSSE, hardware executor backends, etc.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in this figure, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in this figure, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 700.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of computing device may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 6:
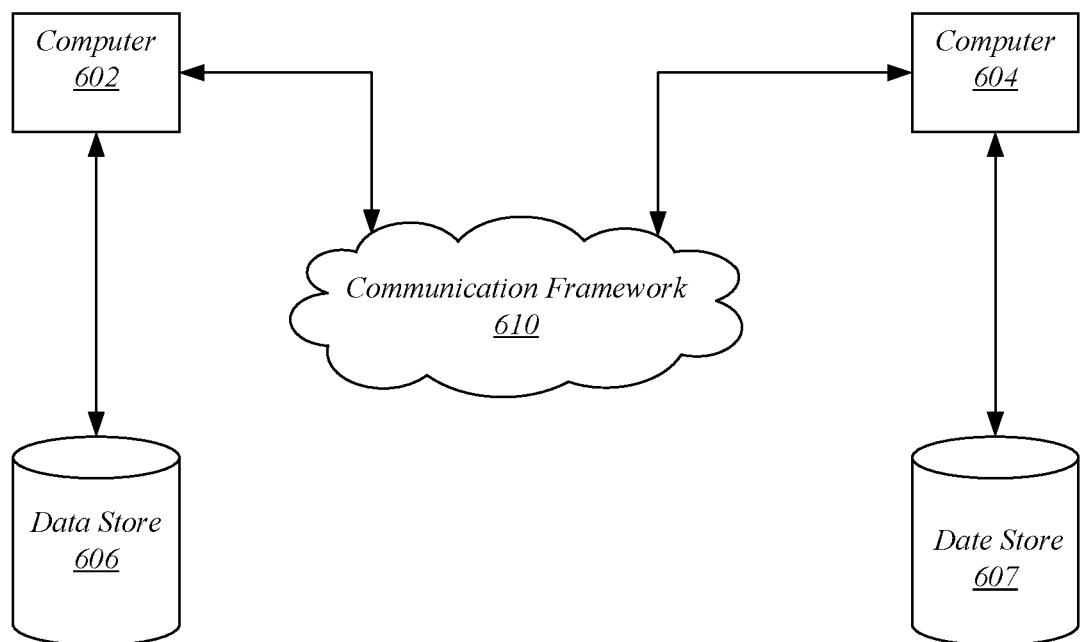
FIG. 6 illustrates an example communications architecture according to one or more embodiments.

FIG. 6 illustrates an exemplary communications architecture 600 suitable for implementing various embodiments. For example, one or more computing devices may communicate with each other via a communications framework 610, which may be a network implemented to facilitate the dynamic and intelligent scheduling of neural network computation on one or more hardware executors via their respective backends.

The communications architecture 600 includes various common communications elements, such as a transmitter, receiver, transceiver, radio, network interface, baseband processor, antenna, amplifiers, filters, power supplies, and so forth. The embodiments, however, are not limited to implementation by the communications architecture 600.

As shown in FIG. 6, the communications architecture 600 includes a computer 602 and a computer 604, which are operatively connected to one or more respective client data stores 606 and 607 that can be employed to store information local to the respective computers 602 and 604, such as cookies and/or associated contextual information. Furthermore, computers 602 and 604 may be like, or include features like, computing architecture 500.

Computers 602 and 604 may communicate information between each other using a communication framework 610. The communications framework 610 may implement any well-known communications techniques and protocols. The communications framework 610 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 610 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computers 602 and 604. A communications network may be any one or combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 7:
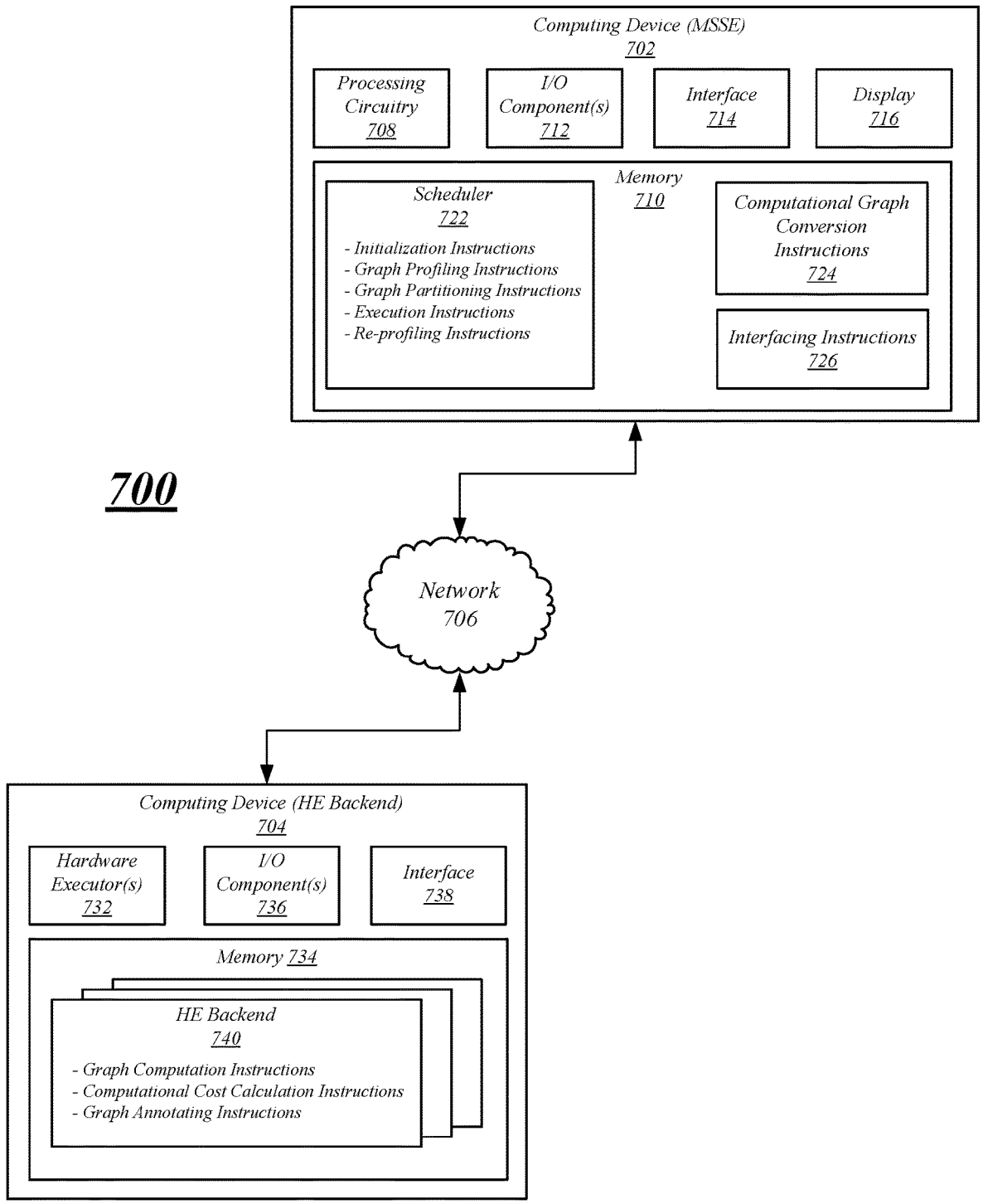
FIG. 7 illustrates an example system according to one or more embodiments.

FIG. 7 illustrates an example hardware executor scheduling system 700 according to embodiments of the present disclosure. As shown, system 700 includes at least one computing device 702 for running an MSSE platform and at least one computing device 704 for running a hardware executor backend, both of which may be connected to each other via network 706. It may be understood that while the MSSE and backend functionalities are performed by separate computing devices, in some examples, both the MSSE and backend features may be supported and performed by the same computing device. Network 706 could be, for example, a local area network (LAN), a wide area network (WAN), or a cellular network (e.g., LTE, 3GPP, or the like). In some embodiments, network 706 could include the Internet.

In examples, at least one computing device 702 (for the MSSE) may include, at least in part, processing circuitry (e.g., a processor) 708, a memory 710, I/O component(s) 712, an interface 714, and a display 716. As illustrated, memory 710 may store one or more instructions for executing specific functions, for example, instructions 724 may include instructions for the scheduler 722, such as initialization, graph profiling, graph partitioning, execution, and/or re-profiling instructions, as described above. Instructions 724 can also include computational graph conversion instructions 724 for receiving an inference or neural network model and converting the model into one or more computational graphs. Moreover, memory 710 may include interfacing instructions 726 for allowing the MSSE to interface and display results for end-users. Information in the memory 710 and other information stored therein may be accessible by or provided to the processing circuitry 708.

At least one computing device 704 (for the hardware executor backend) may include one or more hardware executors (e.g., processor, CPU, GPU, VPU, neural network accelerator, etc.), a memory 734, I/O components 736, and an interface 738. As shown, memory 734 may store various data or information, such as hardware executor instructions 740, which may include instructions for graph computation, computational cost calculations, graph annotation, etc. The instructions 740 may be executable or executed by the processing circuitry 732. Moreover, all other information stored in memory 734 may also be accessible by or provided to the hardware executors 732. As illustrated in FIG. 7, it may be understood that multiple sets of hardware executor (HE) backend instructions 740 may be included in memory 734, each for the respective hardware executor(s) 732. Moreover, in some examples, the scheduler 722 of the at least one computing device 702 may communicate with multiple computing devices, each of which may have its own hardware executor backend(s).

According to examples, the processing circuitry 708 may include circuity or processor logic, such as, for example, any of a variety of commercial processors. In some examples, they may include multiple processors, a multi-threaded processor, a multi-core processor (whether the multiple cores coexist on the same or separate dies), and/or a multi-processor architecture of some other variety by which multiple physically separate processors are in some way linked.

The memories 710 and/or 734 may include logic, a portion of which includes arrays of integrated circuits, forming non-volatile memory to persistently store data or a combination of non-volatile memory and volatile memory. It is to be appreciated, that the memories 710 and/or 734 may be based on any of a variety of technologies. In particular, the arrays of integrated circuits included in the memories may be arranged to form one or more types of memory, such as, for example, dynamic random access memory (DRAM), NAND memory, NOR memory, or the like.

The I/O component(s) 712 and/or 736 may include one or more components to provide input to or to provide output from the client computing device 702 and/or the validator computing device 704. For example, the I/O component(s) 712 and/or 736 may be a keyboard (hardware, virtual, etc.), mouse, joystick, microphone, track pad, button, touch layers of a display, haptic feedback device, camera, microphone, speaker, or the like.

Interfaces 714 and/or 738 may include logic and/or features to support a communication interface. For example, they may include one or more interfaces that operate according to various communication protocols or standards to communicate over direct or network communication links. Direct communications may occur via use of communication protocols or standards described in one or more industry standards (including progenies and variants). For example, the interfaces 714 and/or 738 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like.

Display 716 can be based on any of a variety of display technologies, such as, for example, a cathode ray tube (CRT), a liquid crystal display (LCD), plasma display, light emitting diode (LED) display, or an organic light emitting diode (OLED) display. With some examples, display 716 can be a touch sensitive display. It is noted, display 716 may be external to the client computing device 702, such as, for example, embodied as a computer monitor or television and coupled thereto via any of a variety of display data interfaces. It may be understood that although not shown, the at least one computing device 704 may also include a display, similarly configured to display 716.

Figure 8:
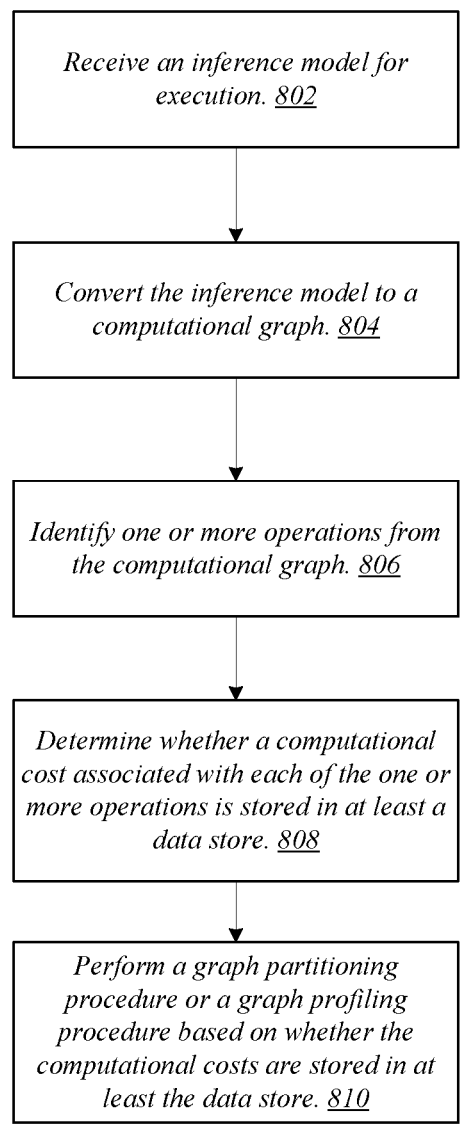
FIG. 8 illustrates a third example flow diagram according to one or more embodiments.

FIG. 8 illustrates an example flow diagram 800 according to embodiments of the present disclosure. It may be understood that the features described in each block may be executed by processing circuitry, and further, it may be understood that the blocks are not required to be performed in any specific order.

At block 802, an inference model may be received for execution. The inference model may be any model, such as a machine learning model, an artificial neural network model, a classification model, or the like. At block 804, the inference model may be converted to a computational graph, as described above. The computational graph may have one or more operations, which may be identified at block 806. For example, an operation may be a mathematical operation described by operator type, input size, and other parameters of the operation (e.g., padding, stride for a convolution, etc.).

At block 808, it is determined whether a computational cost associated with each of the one or more operations is stored in at least one data store. The computational costs associated with the operations may have been previously calculated by one or more hardware executor backends and previously stored in at least one data store. In examples, when all of the computational costs exist in or can be accessed from at least one data store, a graph partitioning procedure may be performed at block 810. When one or more computational costs do not exist in or cannot be accessed, a graph profiling procedure may be performed also at block 810.

As described above, the graph partitioning procedure may involve at least determining the minimal computational cost path in the computational graph to execute or run all of the one or more operations, e.g., dynamically assign or schedule various hardware executors to perform various parts of the model computations in order to achieve optimal performance. In examples, as also described above, the graph profiling procedure may involve at least receiving computational cost estimates for each operation from each available hardware executor backend in order to determine the optimal combination of hardware executors needed for running, executing, or supporting the inference model.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1. An apparatus for dynamic and intelligent deployment of a neural network on one or more hardware executors, the apparatus comprising: memory to store instructions; and processing circuitry, coupled to the memory, operable to execute the instructions, that when executed, cause the processing circuitry to: receive an inference model for execution; convert the inference model to a computational graph; identify one or more operations from the computational graph; determine whether a computational cost associated with each of the one or more operations is stored in at least one data storage device; and partition the computational graph based on a determination that the computational cost for each of the one or more operations is stored in the at least one data storage device; or profile the computational graph based on a determination that the computational cost for each of the one or more operations is not stored in the at least one data storage device.

Example 2. The apparatus of example 1, the processing circuitry to detect one or more hardware executor backends, wherein the one or more hardware executor backends performs computation or execution of the one or more operations via one or more hardware executors.

Example 3. The apparatus of example 2, wherein the one or more hardware executors includes a central processing unit (CPU).

Example 4. The apparatus of example 2, wherein the one or more hardware executors includes a graphics processing unit (GPU).

Example 5. The apparatus of example 2, wherein the one or more hardware executors includes a vision processing unit (VPU).

Example 6. The apparatus of example 2, wherein the one or more hardware executors includes a field programmable gate array (FPGA).

Example 7. The apparatus of example 2, wherein the one or more hardware executors includes a neural network accelerator.

Example 8. The apparatus of example 1, wherein the computation cost is time, resources, or both time and resources required to complete an execution or computation of an operation of the one or more operations.

Example 9. The apparatus of examples 8, wherein the computation cost is measurable in accordance with one or more of the following: (i) required task completion time, (ii) required power consumption, (iii) memory utilization, and (iv) disk usage.

Example 10. The apparatus of example 2, wherein the profiling of the computational graph comprises the processing circuitry to: send the computational graph to each of the one or more hardware executor backends for analysis and annotation; and receive an annotated computational graph from each of the one or more hardware executor backends.

Example 11. The apparatus of example 10, wherein each hardware executor backend: calculates the computation cost of each operation of the computation graph; annotates each operation in the computational graph with one or more of the following information: (i) whether a hardware executor corresponding to the hardware executor backend supports the operation and (ii) the computational cost of the operation; and return the annotated computational graph to the apparatus.

Example 12. The apparatus of example 11, wherein each hardware executor backend: determines whether the one or more operations is fusible into one computation; and annotates the computational graph to indicate the one or more fusible operations.

Example 13. The apparatus of example 11, the processing circuitry to store the computational cost for each of the one or more operations in the at least one storage device.

Example 14. The apparatus of example 2, wherein the partitioning of the computational graph comprises the processing circuitry to: determine a lowest computational cost path for the one or more operations by partitioning execution of at least a first operation of the one or more operations on a first hardware executor backend and partitioning execution of at least a second operation of the one or more operations on a second hardware executor backend.

Example 15. The apparatus of example 14, the processing circuitry to: partition the computational graph into one or more computational subgraphs based at least in part on the determined lowest computational cost path; and send each subgraph to the first hardware executor backend or the second hardware executor backend or both the first and second hardware executor backends for execution.

Example 16. The apparatus of example 14, the first hardware executor backend operatively controls a first hardware executor, the second hardware executor backend operatively controls a second hardware executor, and wherein the first hardware executor is different from the second hardware executor.

Example 17. The apparatus of example 1, the processing circuitry to: determine whether the computational graph will be executed multiple times; and repeat the partitioning or the profiling of the computational graph.

Example 18. A system comprising the apparatus of any one of examples 1 to 17.

Example 19. A method for dynamic and intelligent deployment of a neural network on one or more hardware executors, the method comprising: receiving an inference model for execution; converting the inference model to a computational graph; identifying one or more operations from the computational graph; determining whether a computational cost associated with each of the one or more operations is stored in at least one data storage device; and partitioning the computational graph based on a determination that the computational cost for each of the one or more operations is stored in the at least one data storage device; or profiling the computational graph based on a determination that the computational cost for each of the one or more operations is not stored in the at least one data storage device.

Example 20. The method of example 19, further comprising detecting one or more hardware executor backends, wherein the one or more hardware executor backends performs computation or execution of the one or more operations via one or more hardware executors.

Example 21. The method of example 20, wherein the one or more hardware executors includes one or more of the following: (i) a central processing unit (CPU), (ii) a graphics processing unit (GPU), (iii) a vision processing unit (VPU), (iv) a field programmable gate array (FPGA), and (v) a neural network accelerator.

Example 22. The method of example 19, wherein the computation cost is time, resources, or both time and resources required to complete an execution or computation of an operation of the one or more operations.

Example 23. The method of example 22, wherein the computation cost is measurable in accordance with one or more of the following: (i) required task completion time, (ii) required power consumption, (iii) memory utilization, and (iv) disk usage.

Example 24. The method of example 20, wherein the profiling of the computational graph further comprises: sending the computational graph to each of the one or more hardware executor backends for analysis and annotation; and receiving an annotated computational graph from each of the one or more hardware executor backends.

Example 25. The method of example 24, wherein each hardware executor backend performs: calculating the computation cost of each operation of the computation graph; annotating each operation in the computational graph with one or more of the following information: (i) whether a hardware executor corresponding to the hardware executor backend supports the operation and (ii) the computational cost of the operation; and returning the annotated computational graph to the apparatus.

Example 26. The method of example 25, wherein each hardware executor backend performs: determining whether the one or more operations is fusible into one computation; and annotating the computational graph to indicate the one or more fusible operations.

Example 27. The method of example 25, further comprising storing the computational cost for each of the one or more operations in the at least one storage device.

Example 28. The method of example 20, wherein the partitioning of the computational graph comprises: determining a lowest computational cost path for the one or more operations by partitioning execution of at least a first operation of the one or more operations on a first hardware executor backend and partitioning execution of at least a second operation of the one or more operations on a second hardware executor backend.

Example 29. The method of example 28, further comprising partitioning the computational graph into one or more computational subgraphs based at least in part on the determined lowest computational cost path; and sending each subgraph to the first hardware executor backend or the second hardware executor backend or both the first and second hardware executor backends for execution.

Example 30. The method of example 28, the first hardware executor backend operatively controlling a first hardware executor, the second hardware executor backend operatively controlling a second hardware executor, and wherein the first hardware executor is different from the second hardware executor.

Example 31. The method of example 19, further comprising determining whether the computational graph will be executed multiple times; and repeat the partitioning or the profiling of the computational graph.

Example 32. A system for dynamic and intelligent deployment of a neural network on one or more hardware executors, the system comprising: one or more first computing device comprising: memory to store instructions; and processing circuitry, coupled to the memory, operable to execute the instructions, that when executed, cause the processing circuitry to: receive an inference model for execution; convert the inference model to a computational graph; identify one or more operations from the computational graph; determine whether a computational cost associated with each of the one or more operations is stored in at least one data storage device; and partition the computational graph based on a determination that the computational cost for each of the one or more operations is stored in the at least one data storage device; or profile the computational graph based on a determination that the computational cost for each of the one or more operations is not stored in the at least one data storage device; and one or more second computing devices comprising: memory to store instructions; and one or more hardware executors, coupled to the memory, operable to execute the instructions, that when executed, cause the one or more hardware executors to: receive instructions from the one or more first computing devices to execute at least a portion of the one or more operations.

Example 33. The system of example 32, wherein the one or more hardware executors of the one or more second computing devices includes one or more of the following: (i) a central processing unit (CPU), (ii) a graphics processing unit (GPU), (iii) a vision processing unit (VPU), (iv) a field programmable gate array (FPGA), and (v) a neural network accelerator.

Example 34. The system of example 32, wherein the computation cost is time, resources, or both time and resources required to complete an execution or computation of an operation of the one or more operations.

Example 35. The system of example 32, wherein the profiling of the computational graph comprises the processing circuitry to: send the computational graph to each of the one or more second computing devices for analysis and annotation; and receive an annotated computational graph from each of the one or more second computing devices.

Example 36. The system of example 35, each of the one or more second computing devices to: calculate the computation cost of each operation of the computation graph; annotate each operation in the computational graph with one or more of the following information: (i) whether the one or more hardware executors supports the operation and (ii) the computational cost of the operation; and return the annotated computational graph to the one or more first computing devices.

Example 37. The system of example 36, the processing circuitry to store the computational cost for each of the one or more operations in the at least one storage device.

Example 38. The system of example 32, wherein the partitioning of the computational graph comprises the processing circuitry to: determine a lowest computational cost path for the one or more operations by partitioning execution of at least a first operation of the one or more operations on the one or more second computing devices and partitioning execution of at least a second operation of the one or more operations on the one or more second computing devices.

Example 39. The system of example 38, wherein the transaction is a transmission of one or more data packets.

Example 40. The system of example 39, the processing circuitry to: partition the computational graph into one or more computational subgraphs based at least in part on the determined lowest computational cost path; and send each subgraph to the one or more second computing devices for executions.

Example 41. The system of claim 32, wherein the inference model is an artificial neural network model.

Example 42. At least one machine-readable storage medium comprising instructions that when executed by at least one processor, causes the at least one processor to: receive an inference model for execution; convert the inference model to a computational graph; identify one or more operations from the computational graph; determine whether a computational cost associated with each of the one or more operations is stored in at least one data storage device; and partition the computational graph based on a determination that the computational cost for each of the one or more operations is stored in the at least one data storage device; or profile the computational graph based on a determination that the computational cost for each of the one or more operations is not stored in the at least one data storage device.

Example 43. The at least one machine-readable storage medium of example 42, wherein the computation cost is time, resources, or both time and resources required to complete an execution or computation of an operation of the one or more operations.

Example 44. The at least one machine-readable storage medium of example 42, wherein the inference model is an artificial neural network model.

Example 45. An apparatus comprising means to perform the method of any one of examples 19 to 31.

Example 46. A system comprising means to perform the method of any one of examples 19 to 31.

Example 47. At least one machine-readable storage medium comprising means to perform the method of any one of the examples 19 to 31.

Example 48. An apparatus comprising the at least one machine-readable storage medium of any one of examples 42 to 44.

Example 49. A system comprising the at least one machine-readable storage medium of any one of examples 42 to 44.

What is claimed is:

1. An apparatus, comprising:
one or more hardware executors;
one or more data storage devices;
memory to store instructions; and
processing circuitry, coupled to the memory, operable to execute the instructions, that when executed, cause the processing circuitry to:
 receive an inference model for execution;
 convert the inference model to a computational graph;
 identify one or more operations from the computational graph;
 determine whether an annotated version of the computational graph indicating a computational cost estimate associated with each of the one or more operations is stored in the one or more data storage devices;
 execute all of the operations of the computational graph on each of multiple different types of hardware executors to obtain an annotated version of the computational graph when an annotated version of the computational graph is not stored in the one or more data storage devices, the annotated version of the computational graph comprising computational cost estimates for each operation of the computational graph, and store the annotated version of the computational graph in the one or more data storage devices;
 estimate a total cost of executing the computational graph based on the computational cost estimates from the annotated version of the computational graph; and
 execute one or more operations of the computational graph on one or more of the hardware executors based on the computational cost estimates.

2. The apparatus of claim 1, the instructions further causing the processing circuitry to:
detect one or more hardware executor backends, wherein the one or more hardware executor backends performs computation or execution of the one or more operations via the one or more hardware executors.

3. The apparatus of claim 1, wherein the one or more hardware executors includes two or more of the following: (i) a central processing unit (CPU), (ii) a graphics processing unit (GPU), (iii) a vision processing unit (VPU), (iv) a field programmable gate array (FPGA), and (v) a neural network accelerator.

4. The apparatus of claim 1, wherein the computational cost estimate for each operation comprises time, resources, or both time and resources required to complete an execution or computation of the operation.

5. The apparatus of claim 4, wherein the computational cost estimate for each operation is measurable in accordance with one or more of the following: (i) required task completion time, (ii) required power consumption, (iii) memory utilization, and (iv) disk usage.

6. The apparatus of claim 2, the instructions further causing the processing circuitry to:
send the computational graph to each of the one or more hardware executor backends for analysis and annotation; and
receive an annotated version of the computational graph from each of the one or more hardware executor backends.

7. The apparatus of claim 6, wherein each hardware executor backend:
estimates the computational cost estimate of each operation of the computational graph;
annotates each operation in the computational graph with one or more of the following information: (i) whether the hardware executor corresponding to the hardware executor backend supports the operation and (ii) the computational cost estimate of the operation; and
returns the annotated computational graph to the apparatus.

8. The apparatus of claim 7, wherein each hardware executor backend:
determines whether the one or more operations is fusible into one computation; and
annotates the computational graph to indicate the one or more fusible operations.

9. The apparatus of claim 2, the instructions further causing the processing circuitry to:
determine an approximate of a lowest computational cost path for the one or more operations by partitioning execution of at least: (i) first and second operations of the one or more operations on a first hardware executor backend, (ii) the first and second operations of the one or more operations on a second hardware executor backend, or (iii) the first operation of the one or more operations on the first hardware executor backend and the second operation of the one or more operations on the second hardware executor backend.

10. The apparatus of claim 9, the instructions further causing the processing circuitry to:
partition the computational graph into one or more computational subgraphs based at least in part on the determined approximation of the lowest computational cost path; and
send each subgraph to the first hardware executor backend or the second hardware executor backend or both the first and second hardware executor backends for execution.

11. The apparatus of claim 9, wherein the first hardware executor backend operatively controls a first hardware executor, wherein the second hardware executor backend operatively controls a second hardware executor, and wherein the first hardware executor is different from the second hardware executor.

12. The apparatus of claim 1, the instructions further causing the processing circuitry to:
determine whether the computational graph will be executed multiple times; and
repeat the computational cost estimate for the computational graph.

13. The apparatus of claim 1, wherein the inference model is an artificial neural network model.

14. At least one non-transitory machine-readable storage medium comprising instructions that when executed by at least one processor, causes the at least one processor to:
receive an inference model for execution;
convert the inference model to a computational graph;
identify one or more operations from the computational graph;
determine whether an annotated version of the computational graph indicating a computational cost estimate associated with each of the one or more operations is stored in at least one data storage device;
execute all of the operations of the computational graph on each of multiple different types of hardware executors to obtain an annotated version of the computational graph when an annotated version of the computational graph is not stored in the at least one data storage device, the annotated version of the computational graph comprising computational cost estimates for each operation of the computational graph, and store the annotated version of the computational graph in the at least one data storage device;
estimate a total cost of executing the computational graph based on the computational cost estimates from the annotated version of the computational graph; and
execute one or more operations of the computational graph on one or more of the hardware executors based on the computational cost estimates.

15. The at least one non-transitory machine-readable storage medium of claim 14, wherein the computational cost estimates comprise time, resources, or both time and resources required to complete an execution or computation of an operation of the one or more operations.

16. The at least one non-transitory machine-readable storage medium of claim 14, wherein the inference model is an artificial neural network model.

17. The at least one non-transitory machine-readable storage medium of claim 14, the instructions causing the processor to detect one or more hardware executor backends, wherein the one or more hardware executor backends performs computation or execution of the one or more operations via one or more hardware executors.

18. The at least one non-transitory machine-readable storage medium of claim 14, the instructions causing the processor to:
send the computational graph to each of the one or more hardware executor backends for analysis and annotation; and receive an annotated version of the computational graph from each of the one or more hardware executor backends.

19. The at least one non-transitory machine-readable storage medium of claim 18, the instructions causing the processor to receive an annotated computational graph from each hardware executor backend, each annotated computational graph to annotates each operation in the computational graph with one or more of the following information: (i) whether a hardware executor corresponding to the hardware executor backend supports the operation and (ii) the computational cost estimate of the operation.

20. The at least one non-transitory machine-readable storage medium of claim 17, wherein at least one of the annotated computational graphs to annotates the computational graph to indicate one or more fusible operations.

\* \* \* \* \*